United States Patent [19]

Forsmo

[11] Patent Number: 5,088,658
[45] Date of Patent: Feb. 18, 1992

[54] FIN COMMAND MIXING METHOD

[75] Inventor: Dennes P. Forsmo, Acton, Mass.

[73] Assignee: Raytheon Company, Lexington, Mass.

[21] Appl. No.: 672,279

[22] Filed: Mar. 20, 1991

[51] Int. Cl.$^5$ .............................................. F42B 10/64
[52] U.S. Cl. .................................................. 244/3.21
[58] Field of Search ................... 244/3.1, 3.15, 3.21, 244/76 R, 177, 179, 180, 181

[56] References Cited

U.S. PATENT DOCUMENTS

| | | | |
|---|---|---|---|
| 2,824,710 | 2/1958 | Hall | 244/3.21 |
| 2,967,031 | 1/1961 | Chase et al. | 244/3.15 |
| 3,575,362 | 4/1971 | Hammond et al. | 244/3.2 |
| 3,946,968 | 3/1976 | Stallard | 244/3.21 |
| 4,530,476 | 7/1985 | Thurber, Jr. et al. | 244/3.21 |

*Primary Examiner*—Charles T. Jordan
*Attorney, Agent, or Firm*—Donald F. Mofford; Richard M. Sharkansky

[57] ABSTRACT

A method of providing fin commands for a vehicle is shown to include the steps of calculating a pitch-to-roll command ratio equal to an absolute value of a pitch command divided by a roll command and calculating a yaw-to-roll command ratio equal to an absolute value of a yaw command divided by the roll command, differencing the yaw-to-roll command ratio with the pitch-to-roll command ratio to provide a difference value, and apportioning the roll command to at least one of a plurality of control fins in relation to the value of said difference value. With this arrangement, a method of apportioning a roll command to a plurality of control surfaces wherein the maximum deflection required by the control surfaces is minimized by apportioning more roll to the plane having the smaller maneuver.

11 Claims, 2 Drawing Sheets

FIN COMMAND MIXING METHOD

BACKGROUND OF THE INVENTION

This invention pertains generally to flight vehicles and particularly to airborne flight vehicles wherein four independent control surfaces are used to control flight of the airborne flight vehicle.

In a flight vehicle, control surfaces are used to provide pitch, yaw and roll control of the flight vehicle. For example, control surfaces such as control fins are used to control flight of a missile and a torpedo. Additionally, control surfaces such as jet exhaust ports are used to control flight of a torpedo in water and a vehicle in space.

As it is known, in various controlled flight vehicles, including a controlled missile, commands to control the control surfaces are produced by a guidance system in the missile and provided to an autopilot to control the flight of the missile. In one conventional missile guidance technique, a pitch command, a yaw command and a roll command are provided by the guidance system to the autopilot so that the autopilot may provide control signals to fin control circuitry to command the control fins for control of the missile.

Typically in a missile, two control fins are used for pitch control, two orthogonally positioned control fins are used for yaw control and all four control fins are used for roll control. In an environment wherein the missile must maneuver, one of the control fins is deflected to a larger angle than the other control fins. Typically, the autopilot, when providing the control signals to the fin control circuitry, will apportion the roll requirement to each of the control fins and then apportion the pitch and yaw requirement. In an environment wherein a maneuver requires a control fin deflection greater than that capable by the control fin, then typically the roll apportionment is given priority by the autopilot and the pitch and yaw requirement is reduced to a degree that is allowed by maximum deflection of the control fin. In such a condition, the control fins cannot respond as necessary and the missile cannot maneuver as required.

SUMMARY OF THE INVENTION

With the foregoing background of this invention in mind, it is a primary object of this invention to provide a method of operating a vehicle having greater lateral maneuverability than known vehicles.

Another object of this invention is to provide a flight vehicle wherein control fin deflection is minimized when the flight vehicle is maneuvering.

The foregoing and other objects of this inventions are met generally by a method of operating a vehicle including the step of apportioning, in response to a pitch command and a yaw command, a roll command to at least one of a plurality of control surfaces.

With this arrangement, lateral maneuverability of the vehicle is increased by apportioning more roll to the axis having a smaller maneuver.

In accordance with the present invention, the step of apportioning the roll command includes the steps of calculating a pitch-to-roll command ratio equal to an absolute value of the pitch command divided by the roll command and calculating a yaw-to-roll command ratio equal to an absolute value of the yaw command divided by the roll command, differencing the yaw-to-roll command ratio with the pitch-to-roll command ratio to provide a difference value, and apportioning the roll command to at least one of a plurality of control surfaces in relation to the value of said difference value.

With this arrangement, the method of apportioning the roll command to the plurality of control surfaces is in accordance with the relationship among the pitch, yaw and roll commands so that the maximum deflection required by the control surfaces is minimized by apportioning more roll to either the pitch axis or the yaw axis.

In accordance with a still further aspect of the present invention, the step of apportioning the roll command further comprises the steps of apportioning, if the difference value of the yaw-to-roll command ratio subtracted from the pitch-to-roll command ratio is equal to or greater than 0.5, the roll command equally to the yaw command surfaces, apportioning, if the difference value of the pitch-to-roll command ratio subtracted from the yaw-to-roll command ratio is equal to or greater than 0.5, the roll command equally to the pitch control surfaces and apportioning, if the difference value of the yaw-to-roll command ratio subtracted from the pitch-to-roll command ratio and the pitch-to-roll command ratio subtracted from the yaw-to-roll command ratio are less than one-half, a portion of the roll command to the pitch control surfaces and a portion of the roll command to the yaw control surfaces.

With this arrangement, the maneuverability of a vehicle including an airborne vehicle with control fins maneuvering about a pitch plane and a yaw plane is increased, such that as a combined pitch and roll command or a combined yaw and roll command exceed a maximum control fin angular deflection or rate limit of the airborne vehicle in one of the planes, the roll command is apportioned to the alternative plane to reduce the maximum control fin angular deflection and fin rate.

In accordance with the present invention, a vehicle includes an autopilot for providing a pitch-to-roll command ratio and a yaw-to-roll command ratio and for differencing the yaw-to-roll command ratio with the pitch-to-roll command ratio to provide a difference value, and for providing a roll command to at least one of a plurality of control surfaces in response to said difference value.

With such an arrangement, the autopilot can apportion the roll command among the control surfaces of the vehicle so that maximum angular deflection among the control surfaces is minimized.

In accordance with a still further aspect of the present invention, the autopilot includes means, in response to the difference value, for providing, alternatively, all of the roll command to the yaw control surfaces, all of the roll command to the pitch control surfaces, or a portion of the roll command to the yaw control surfaces and a portion of the roll command to the pitch control surfaces.

With such an arrangement, an airborne vehicle with control fins can maneuver with a greater turn rate since the deflection of the control fins are apportioned among the control fins so that maximum control fin deflection is minimized.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Before departing on a detailed explanation of the contemplated invention, it should be appreciated that, although the vehicle is described as a missile having control fins, the vehicle could include any vehicle controlled by control surfaces such as a rocket ship in space having jet exhaust ports as control surfaces, a torpedo in water having either control fins or exhaust ports as control surfaces and a missile having jet exhaust ports.

Figure 1:
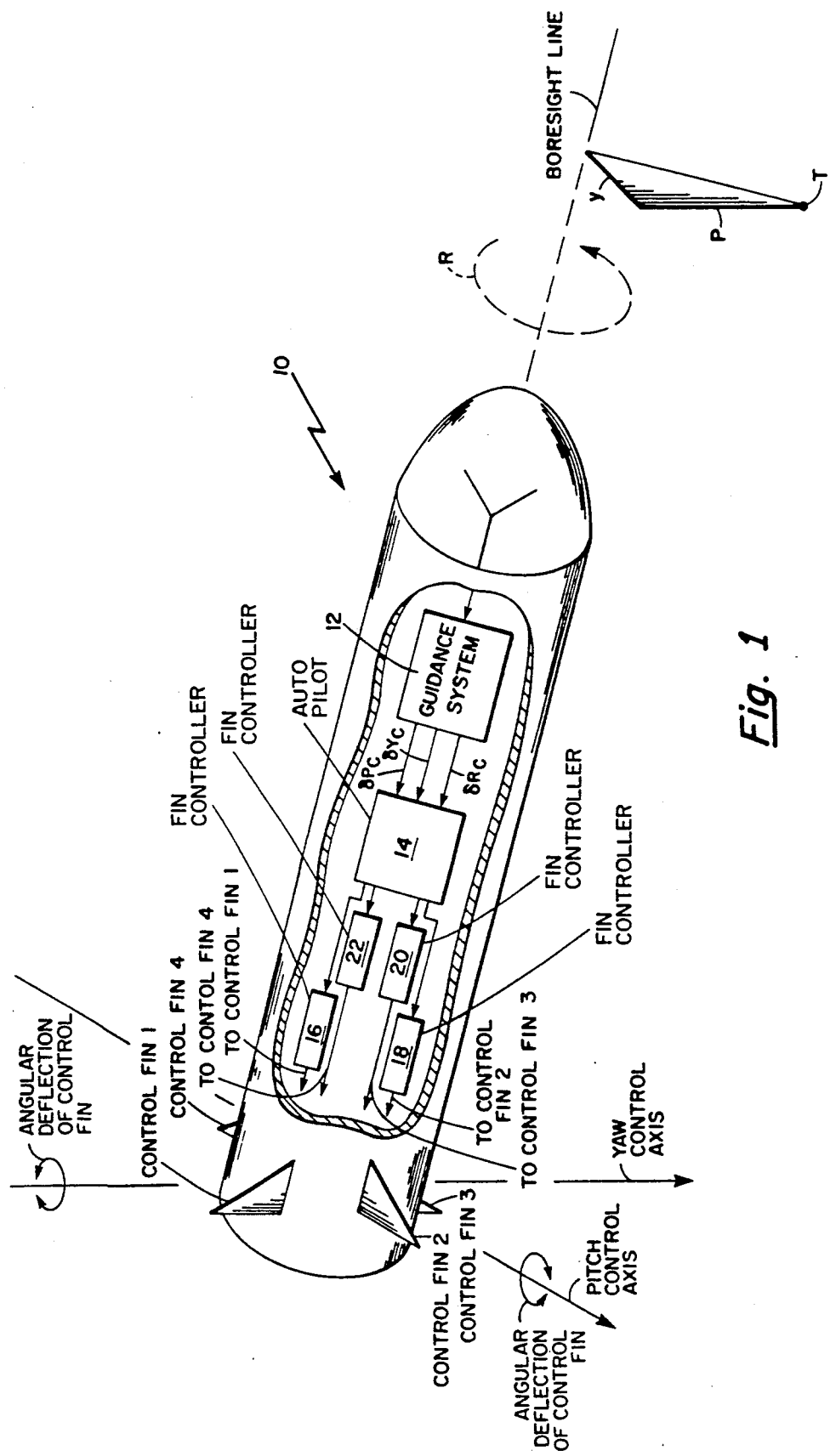
FIG. 1 is a sketch showing an exemplary airborne vehicle according to the invention to illustrate in the simplest and clearest manner the way in which fin deflection may be reduced.

Referring now to FIG. 1, it may be seen that a vehicle, such as an airborne vehicle and here missile 10, is shown to include a plurality of control surfaces, here control fins including control fin 1, control fin 2, control fin 3 and control fin 4. Each of the plurality of control fins is able to provide angular deflection such that the amount of angular deflection provided by each one of the plurality of control fins controls the course of flight of the missile 10. The control fins 1, 2, 3 and 4 are constructed and attached to the missile 10 in a known manner. The amount of angular deflection provided by each of the control fins 1, 2, 3 and 4 is controlled by, respectively, fin controller 16, fin controller 18, fin controller 20 and fin controller 22. Each of the fin controllers 16, 18, 20 and 22 is fed a control signal from an autopilot 14. The control signal fed from the autopilot 14 controls the amount of angular deflection provided by control fins 1, 2, 3 and 4 as controlled by each corresponding fin controller 16, 18, 20 and 22. The autopilot 14 is fed command signals including a pitch command, $\delta P_c$, a yaw command, $\delta Y_c$, and a roll command, $\delta R_c$, from a guidance system 12. Thus, as shown, control fin 2 and control fin 4 provide control in pitch, P, (also referred to as elevation) of the missile 10 and control fin 1 and control fin 3 provide control in yaw, Y, (also referred to as azimuth) of the missile 10. The control fins 1, 2, 3 and 4 also provide control of roll, R, of the missile as described further hereinafter.

As shown in FIG. 1, it should be apparent the missile 10 includes a boresight line which is coaxial with a centerline of an antenna which is part of the guidance system 12. A target T is located some distance from the missile 10 and using the boresight line as a reference, the guidance system 12 develops a boresight error in pitch and a boresight error in yaw. Using proportional navigation in a known manner, the guidance system 12 provides the pitch command, the yaw command and the roll command to the autopilot 14 to steer the missile 10 along a trajectory to intercept the target T.

It should be appreciated that many factors are entertained by the guidance system 12 to provide the pitch, yaw and roll commands to the autopilot 14. For example, it is known that, depending on the maneuver, a deflection by the control fins 1 and 3 to provide a control in yaw may induce a roll by the missile 10 due to the aerodynamic environment of the missile 10. Known techniques are used to correct such factors and to have an understanding of the operation of the present invention discussion of such techniques are not necessary.

Defining a Cartesian coordinate system with an X axis, a Y axis and a Z axis, viewing the missile 10 from the rear, the X axis extends along the center of the missile 10, the Y axis extends along a line provided by control fins 4 and 2 and the Z axis extends along a line provided by control fins 1 and 3. It should be appreciated a pitch plane is defined by the XZ axis and a yaw plane is defined by the XY axis. Angular fin deflection is defined by the right hand rule. Defining angular deflection by the right hand rule, a positive roll command would cause the missile 10 to roll in a clockwise direction. Completing our definition of terms, if a term $\delta F_c$ defines the angular deflection of each fin wherein F is one of the control fins, then $\delta 1_c$ defines the angular deflection of control fin 1, $\delta 2_c$ defines the angular deflection of control fin 2, $\delta 3_c$ defines the angular deflection of control fin 3 and $\delta 4_c$ defines the angular deflection of control fin 4. With such an arrangement, a pitch fin command $\delta P_c$ would equal $(\delta 2_c + \delta 4_c) \div 2$, a yaw fin command $\delta Y_c$ would equal $(\delta 1_c + \delta 3_c) \div 2$ and a roll fin command $\delta R_c$ would equal $(\delta 4_c - \delta 2_c) + (\delta 1_c - \delta 3_c)$. In such a coordinate system, control fins 4 and 2 provide control of pitch, P, control fins 1 and 3 provide control of yaw, Y, and control fins 1, 2, 3 and 4 provide control of roll, R.

In a vehicle, including missile 10, the guidance system 12 provides the pitch command $\delta P_c$, the yaw command $\delta Y_c$ and the roll command $\delta R_c$ to the autopilot 14 wherein, using the coordinate system defined hereinbefore, the autopilot 14 provides fin control signals to the respective fin controllers 16, 18, 20 and 22 causing control fins 2 and 4 to provide control of pitch, P, control fins 1 and 3 to provide control of yaw, Y, and control fins 1, 2, 3 and 4 to provide, equally, control of roll R. Thus, for example, if a pitch command of twenty-five degrees, a yaw command of ten degrees and a roll command of ten degrees is fed to the autopilot 14 from the guidance system 12, then the autopilot 14 will provide appropriate control signals to each one of the fin controllers 16, 18, 20 and 22. For this example, to accommodate the pitch command of twenty-five degrees, the autopilot 14 would provide a control signal to the fin controller 18 to deflect the control fin 2 an amount of twenty-five degrees, and provide a control signal to the fin controller 22 to deflect the control fin 4 an amount of twenty-five degree. To accommodate the yaw fin command of ten degrees, the autopilot 14 would provide a control signal to fin controller 16 to deflect the control fin 1 an amount of ten degrees and provide a control signal to fin controller 20 to deflect the control fin 3 an amount of ten degrees. To accommodate the roll command of plus ten degrees, the autopilot 14 would modify the control signal to fin controller 16 to deflect the control fin 1 an amount of 12.5 degrees instead of ten degrees, modify the control signal to fin controller 18 to deflect the control fin 2 an amount of 22.5 degrees instead of 25 degrees, modify the control signal to fin controller 20 to deflect control fin 3 an amount of 7.5 degrees instead of ten degrees and modify the control signal to fin controller 22 to deflect control fin 4 an amount of 27.5 degrees instead of 25 degrees. Recapitulating, a pitch fin command of twenty-five degrees, a yaw fin command of ten degrees and a roll fin command of ten degrees fed to the autopilot 14 will cause the autopilot 14 to provide appropriate control signals to the respective fin controllers 16, 18, 20 and 22 so that control fin 1 is deflected 12.5 degrees, control fin 2 is deflected 22.5 degrees, control fin 3 is deflected 7.5 degrees and control fin 4 is deflected 27.5 degrees. Although satisfactory for some instances, such a configuration can be a problem. For example, if the missile 10 is configured such that control fins 1, 2, 3 and 4 can provide a maximum angular deflection of plus or minus twenty-five degrees, then in the present example, control fin 4 cannot deflect the necessary amount. In such an environment, typically the autopilot 14 gives precedence to the roll command, so that, in the present example, control fin 4 is deflected 25 degrees, control fin 2 is deflected 20 degrees, and control fins 1 and 3 are deflected 12.5 degrees and 7.5 degrees, respectively. With such an arrangement, invoking roll command preference the pitch command is reduced to an equivalent value of 22.5°

$$\left(\frac{25 + 20}{2}\right)$$

rather than the desired 25° which thus can reduce available pitch plane maneuver. To solve such a dilemma, the present invention of a fin command mixing method as to be described can be used.

Figure 2:
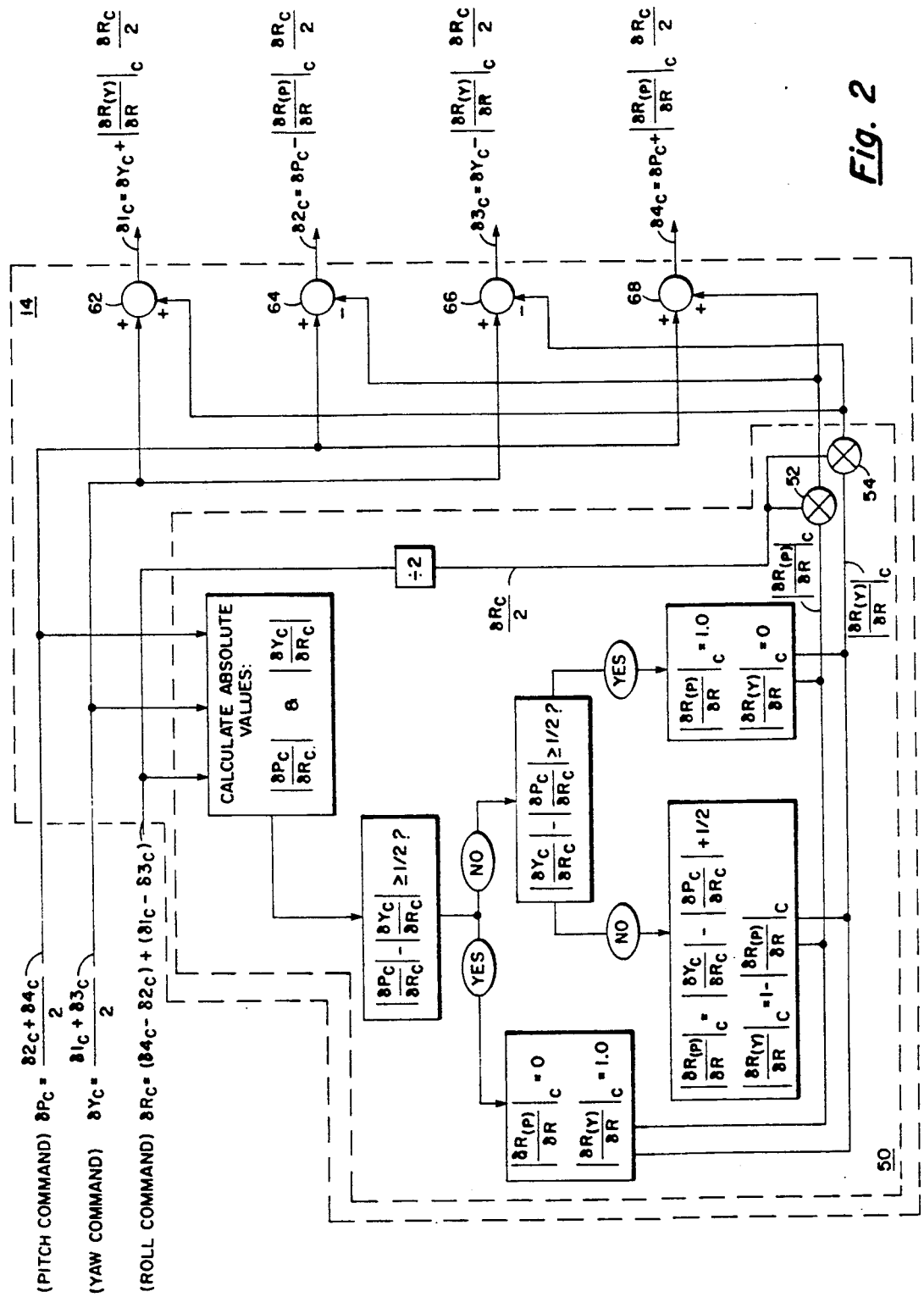
FIG. 2 is a flow chart of a method implemented by the autopilot of FIG. 1 to provide the requisite commands contemplated by the invention.

Referring now to FIGS. 1 and 2, a method of operating a vehicle, here missile 10, is shown to include apportioning the roll command such that control fin deflection is minimized. As described hereinbefore, the pitch command, $\delta P_c$, the yaw command, $\delta Y_c$, and the roll command $\delta R_c$ is provided to the autopilot 14 from the guidance system 12. A pitch-to-roll command ratio is calculated equal to an absolute value of the pitch command divided by the roll command and a yaw-to-roll command ratio is calculated equal to an absolute value of the yaw command divided by the roll command. The yaw-to-roll command ratio is differenced with the pitch-to-roll command ratio and if the result thereof is equal to or greater than a value 0.5, then all of the roll command is apportioned to the yaw fins 1 and 3, $$\left|\frac{\delta R_{(Y)}}{\delta R}\right|_c = 1$$

and none of the roll command is apportioned to the pitch fins 2 and 4, $$\left|\frac{\delta R_{(P)}}{\delta R}\right|_c = 0$$

If the result of the yaw-to-roll command ratio differenced with the pitch-to-roll command ratio is less than the value 0.5, then the pitch-to-roll command ratio is differenced with the yaw-to-roll command ratio. If the result of the latter is equal to or greater than the value 0.5, then all of the roll command is apportioned to the pitch fins 2 and 4, $$\left|\frac{\delta R_{(P)}}{\delta R}\right|_c = 1$$

and none of the roll command is apportioned to the yaw fins 1, and 3, $$\left|\frac{\delta R_{(Y)}}{\delta R}\right|_c = 0$$

If the result of the pitch-to-roll command ratio differenced with the yaw-to-roll command ratio is less than the value 0.5, then the roll command is apportioned between the yaw fins 1 and 3 and the pitch fins 2 and 4 in a manner as to be described.

If the value of the yaw-to-roll command ratio differenced with the pitch-to-yaw command is less than 0.5 and the value of the pitch-to-roll command ratio differenced with the yaw-to-roll value is less than 0.5, then a first portion of the roll command is apportioned to the pitch fins 2 and 4, the first portion of the roll command $$\left|\frac{\delta R_{(P)}}{\delta R}\right|_c$$

being the percentage of the roll command equal to the pitch-to-roll command ratio differenced with the yaw-to-roll command ratio added to 0.5. A second portion of the roll command $$\left|\frac{\delta R_{(Y)}}{\delta R}\right|_c$$

being the percentage of the roll command equal to the first portion of the roll command differenced with unity is apportioned to the yaw fins 1 and 3. With such an arrangement, if the autopilot 14 of the missile 10 provides fin commands having a roll portion, a yaw portion and a pitch portion, then the required roll command can be apportioned entirely to the pitch fins 2 and 4, if the yaw fins 1 and 3 are commanded to large deflection angles or, alternatively, the required roll command can be apportioned entirely to the yaw fins 1 and 3, if the pitch fins 2 and 4 are commanded to large deflections. If the yaw fins 1 and 3 the pitch fins 2 and 4 are sufficiently close in value (as determined by the pitch-to-roll command ratio and yaw-to-roll command ratio), then the roll command is apportioned between the pitch fins 2 and 4 and the yaw fins 1 and 3 as described hereinabove.

Now, for example, if we have an environment wherein the autopilot 14 is fed a pitch command of twenty-five degrees, a yaw command of ten degrees and a roll command of ten degrees from the guidance system 12, then the autopilot 14 will provide control signals to the fin controller 16, 18, 20 and 22 as follows. Calculating the pitch-to-roll command ratio which equals the absolute value of the pitch command, $\delta P_c$, divided by the roll command, $\delta R_c$, here twenty-five degrees divided by ten degrees, provides the value 2.5. Calculating the yaw-to-roll command ratio which equals the absolute value of the yaw command, $\delta Y_c$, divided by the roll command, $\delta R_c$, here ten degrees divided by ten degrees, provides the value 1. Differencing the yaw-to-roll command ratio with the pitch-to-roll command ratio, here 2.5−1.0, provides the value 1.5. Since the value 1.5 is greater than the value 0.5, the portion of the roll command apportioned to the pitch fins 2 and 4 is zero, $$\left|\frac{\delta R_{(P)}}{\delta R}\right|_c = 0$$

and all of the roll command is apportioned to the yaw fins 1 and 3, $$\left| \frac{\delta R_{(Y)}}{\delta R} \right|_c = 1$$

Thus, for the present example, the autopilot 14 would provide a control signal to the fin controller 16 to deflect the control fin 1 an amount of 15 degrees, provide a control signal to the fin controller 18 to deflect the control fin 2 an amount of 25 degrees, provide a control signal to the fin controller 20 to deflect the control fin 3 an amount of five degrees and provide a control signal to the fin controller 22 to deflect the control fin 4 an amount of 25 degrees.

It should now be apparent, by apportioning all of the roll command, $\delta R_c$, to the yaw fins 1 and 3 and apportioning none of the roll command to the pitch fins 2 and 4, the angular deflection of control fin 4 is reduced below the angular deflection limit of 25 degrees as described in the example.

As a first alternative, if we have an environment wherein the autopilot 14 is fed a pitch command of ten degrees, a yaw command of twenty-five degrees and a roll command of ten degrees from the guidance system 12, then the autopilot 14 will provide control signals to the fin controllers 16, 18, 20 and 22 as follows. Calculating the pitch-to-roll command ratio, ten degrees divided by ten degrees, provides the value 1.0. Calculating the yaw-to-roll command ratio, twenty-five degrees divided by ten degrees, provides the value 2.5. Differencing the yaw-to-roll command ratio with the pitch-to-roll command ratio, here 1.0−2.5, provides the value −1.5. Since the value −1.5 is less than the value 0.5, the pitch-to-roll command ratio is differenced with the yaw-to-roll command ratio, here 2.5−1.0, providing the value 1.5. Since the value 1.5 is greater than the value 0.5, all of the roll command is apportioned to the pitch fins 2 and 4, $$\left| \frac{\delta R_{(P)}}{\delta R} \right|_c = 1$$

and none of the roll command is apportioned to the yaw fins 1 and 3, $$\left| \frac{\delta R_{(Y)}}{\delta R} \right|_c = 0$$

For this example, the autopilot 14 would provide a control signal to the fin controller 16 to deflect the control fin 1 an amount of 25 degrees, provide a control signal to the fin controller 18 to deflect the control fin 2 an amount of five degrees, provide a control signal to the fin controller 20 to deflect the control fin 3 an amount of 25 degrees and provide a control signal to the fin controller 22 to deflect the control fin 4 an amount of 15 degrees.

It should be apparent, by apportioning all of the roll command, $\delta R_c$, to the pitch fins 2 and 4 and apportioning none of the roll command to the yaw fins 1 and 3, the angular deflection of the control fin 1 is reduced below the angular deflection limit of 25 degrees.

As a second alternative, if we have an environment wherein the autopilot 14 is fed a pitch command of twenty degrees, a yaw command of fifteen degrees and a roll command of fifteen degrees from the guidance system 12, then the autopilot 14 will provide control signals to the fin controllers 16, 18, 20 and 22 as follows.

Calculating the pitch-to-roll command ratio, twenty degrees divided by fifteen degrees, provides the value 1.333. Calculating the yaw-to-roll command ratio, fifteen degrees divided by fifteen degrees, provides the value 1.0. Differencing the yaw-to-roll command ratio with the pitch-to-roll command ratio, here 1.333−1.0, provides the value 0.333. Since the value 0.333 is less than the value 0.5, the pitch-to-roll command ratio is differenced with the yaw-to-roll command ratio, here 1.0−1.333, providing the value −0.333. Since the value −0.333 is less than the value 0.5, then the roll command $\delta R_c$ is apportioned between the pitch fins 2 and 4 and the yaw fins 1 and 3 in the following manner.

Since the value of the yaw-to-roll command ratio differenced with the pitch-to-yaw command ratio is less than 0.5 and the value of the pitch-to-roll command ratio differenced with the yaw-to-roll command ratio is less than 0.5, then a first portion of the roll command is apportioned to the pitch fins 2 and 4, the first portion of the roll command being the percentage of the roll command equal to the pitch-to-roll command ratio differenced with the yaw-to-roll command ratio added to 0.5.

For the present example, the first portion of the roll command would equal 1.0−1.333 which equals −0.333 which is added to 0.5 providing the value 0.167. Thus, approximately 16.7 percent of the total roll command is apportioned to the pitch fins 2 and 4, $$\left| \frac{\delta R_{(P)}}{\delta R} \right|_c = 0.167$$

For the present example, the second portion of the roll command would equal 1.0−0.167 providing the value 0.833. Thus, approximately 83.3 percent of the total roll command is apportioned to the yaw fins 1 and 3, $$\left| \frac{\delta R_{(Y)}}{\delta R} \right|_c = 0.833$$

With the foregoing in mind, in the present example of the autopilot 14 being fed a pitch command of twenty degrees, a yaw command of fifteen degrees and a roll command of fifteen degrees, the autopilot 14 provides a control signal to the fin controller 16 to deflect the control fin 1 an amount of 21.25 degrees, a control signal to the fin controller 18 to deflect the control fin 2 an amount of 18.75 degrees, a control signal to the fin controller 20 to deflect the control fin 3 an amount of 8.75 degrees and a control signal to the fin controller 22 to deflect the control fin 4 an amount of 21.25 degrees. It should be appreciated that when the roll command is apportioned between the pitch fins 2 and 4 and the yaw fins 1 and 3, then the pitch control fin with the maximum deflection and the yaw control fin with the maximum deflection are deflected an equal amount. With such an arrangement, the maximum fin deflection required of the control fins 1, 2, 3 and 4 is minimized.

Referring now to FIG. 2, the method as described hereinbefore is shown implemented by the autopilot 14 having a digital computer 50 and adders 62 and 68 and subtractors 64 and 66. The pitch command $\delta P_c$, the yaw command $\delta Y_c$ and the roll command $\delta R_c$ are fed into computer 50. The pitch command $\delta P_c$ is also fed into adder 68 and subtractor 64 and the yaw command $\delta Y_c$ is also fed into adder 62 and subtractor 66. Using the technique as described hereinbefore, the computer calculates the value of the portion of the roll command that is apportioned to the pitch fins 2 and 4 (FIG. 1), $$\left| \frac{\delta R_{(P)}}{\delta R} \right|_C$$

which is fed to a multiplier 52 and calculates the value of the portion of the roll command that is apportioned to the yaw fins 1 and 3 (FIG. 1), $$\left| \frac{\delta R_{(Y)}}{\delta R} \right|_C$$

which is fed to a multiplier 54. The roll command $\delta R_c$ is also divided by two and fed to a second input of multipliers 52 and 54, respectfully.

The output of the multiplier 52 is fed to a second input of adder 68 and added to the pitch command $\delta P_c$ to provide the control signal $$\delta 4_c = \delta P_c + \left| \frac{\delta R_{(P)}}{\delta R} \right|_C \frac{\delta R_c}{2}$$

to fin controller 22 to deflect the control fin 4 accordingly. The output of the multiplier 52 is also fed to the subtractor 64 and subtracted from the pitch command $\delta P_c$ to provide the control signal $$\delta 4_c = \delta P_c - \left| \frac{\delta R_{(P)}}{\delta R} \right|_C \frac{\delta R_c}{2}$$

to fin controller 18 to deflect the control fin 4 accordingly.

The output of the multiplier 54 is fed to a second input of adder 62 and added to the yaw command $\delta Y_c$ to provide the control signal $$\delta 1_c = \delta Y_c - \left| \frac{\delta R_{(Y)}}{\delta R} \right|_C \frac{\delta R_c}{2}$$

to fin controller 16 to defect the control fin 1 accordingly. The output of the multiplier 54 is also fed to a second input of subtractor 66 and subtracted from the yaw command $\delta Y_c$ to provide the control signal $$\delta 3_c = \delta Y_c - \left| \frac{\delta R_{(Y)}}{\delta R} \right|_C \frac{\delta R_c}{2}$$

to fin controller 20 to deflect the control fin 3 accordingly.

Having described this invention, it will now be apparent to one of skill in the art that the disposition of the control fins may be changed without affecting this invention. Further, the coordinate system used to describe the invention could be changed from the one discussed. It is felt, therefore, that this invention should not be restricted to its disclosed embodiment, but rather should be limited only by the spirit and scope of the appended claims.

What is claimed is:

1. A method of operating a vehicle comprising the step of apportioning, in response to a pitch command and a yaw command, a roll command to at least one of a plurality of control surfaces.

2. The method as recited in claim 1 wherein the step of apportioning comprises the steps of:
   (a) calculating a pitch-to-roll command ratio equal to an absolute value of the pitch command divided by the roll command and calculating the yaw-to-roll command ratio equal to an absolute value of a yaw command divided by the roll command;
   (b) differencing the yaw-to-roll command ratio with the pitch-to-roll command ratio to provide a difference value; and
   (c) apportioning the roll command to at least one of the plurality of control surfaces in relation to the value of said difference value.

3. The method as recited in claim 2 wherein the step of apportioning the roll command further comprises the steps of:
   (a) apportioning, if the difference value of the yaw-to-roll command ratio subtracted from the pitch-to-roll command ratio is equal to or greater than 0.5, the roll command equally to yaw control surfaces;
   (b) apportioning, if the difference value of the pitch-to-roll command ratio subtracted from the yaw-to-roll command ratio is equal to or greater than 0.5, the roll command equally to pitch control surfaces; and
   (c) apportioning, if the difference value of the yaw-to-roll command ratio subtracted from the pitch-to-roll command ratio and the pitch-to-roll command ratio subtracted from the yaw-to-roll command ratio are less than 0.5, a portion of the roll command to the pitch control surfaces and a portion of the roll command to the yaw control surfaces.

4. The method as recited in claim 3 wherein the step of apportioning a portion of the roll command to the pitch and yaw control surfaces comprises the steps of:
   (a) calculating a first value equal to the pitch-to-roll command ratio subtracted from the yaw-to-roll command ratio and adding 0.5 to the result thereof;
   (b) calculating a second value equal to a difference between the first value and unity; and
   (c) apportioning a portion of the roll command related to the first value to the pitch control surfaces and a portion of the roll command related to the second value to the yaw control surfaces.

5. The method as recited in claim 4 wherein the step of calculating a pitch-to-roll command ratio and a yaw-to-roll command ratio further comprises the step of providing a pitch command, a yaw command and a roll command.

6. A method of operating a vehicle comprising the step of:
   (a) providing a pitch command, a yaw command and a roll command;
   (b) calculating a pitch-to-roll command ratio equal to an absolute value of the pitch command divided by the roll command and calculating a yaw-to-roll command ratio equal to an absolute value of the yaw command divided by the roll command;
   (c) calculating a first difference value equal to the yaw-to-roll command ratio subtracted from the pitch-to-roll command ratio;

(d) apportioning, if the first difference value is equal to or greater than 0.5, all of the roll command to yaw control surfaces;

(e) calculating, if the first difference value is less than 0.5, a second difference value equal to the pitch-to-roll command ratio subtracted from the yaw-to-roll command ratio;

(f) apportioning, if the second difference value is equal to or greater than 0.5, all of the roll command to pitch control surfaces; and (g) apportioning, if the first and the second difference value are less than 0.5, a portion of the roll command to the yaw control surfaces and a portion of the roll command to the pitch control surfaces.

7. The method as recited in claim 6 wherein the steps of apportioning a portion of the roll command to the yaw and the pitch control surfaces comprises the steps of:

(a) calculating a third difference value equal to the pitch-to-roll command ratio subtracted from the yaw-to-roll command ratio and adding 0.5 to the result thereof;

(b) calculating a fourth difference value equal to the third difference value subtracted from unity; and (c) apportioning a portion of the roll command related to the third difference value to the pitch control surfaces and apportioning a portion of the roll command related to the fourth difference value to the yaw control surfaces.

8. A vehicle comprising:

(a) means for providing a pitch-to-roll command ratio and a yaw-to-roll command ratio and for differencing the yaw-to-roll command ratio with the pitch-to-roll command ratio to provide a difference value; and (b) means for providing a roll command to at least one of a plurality of control surfaces in response to said difference value.

9. The vehicle as recited in claim 8 further comprising:

(a) means for providing a pitch command, a yaw command, and a roll command; and (b) wherein the pitch-to-roll command ratio is equal to an absolute value of the pitch command divided by the roll command and the yaw-to-roll value is equal to an absolute command ratio of the yaw command divided by the roll command.

10. The vehicle as recited in claim 9 wherein the control surfaces are pitch and yaw control fins and the means for providing a roll command further comprises:

(a) means, in response to the difference value, for providing all of the roll command to the yaw fins and, alternatively, for providing all of the roll command to the pitch fins; and (b) means, in response to the difference value, for providing a portion of the roll command to the yaw fins and for providing a portion of the roll command to the pitch fins.

11. The vehicle as recited in claim 10 wherein:

(a) if the difference value of the yaw-to-roll command ratio subtracted from the pitch-to-roll command ratio is equal to or greater than 0.5, then all of the roll command is provided to the yaw fins;

(b) if the difference value of the pitch-to-roll command ratio subtracted from the yaw-to-roll command ratio is equal to or greater than 0.5, then all of the roll command is provided to the pitch fins; and (c) if the difference value of the yaw-to-roll command ratio subtracted from the pitch-to-roll command ratio and the pitch-to-roll command ratio subtracted from the yaw-to-roll command ratio are less than 0.5, then the portion of the roll command that is provided to the pitch fins is related to the roll command multiplied by a first value, the first value equal to the pitch-to-roll command ratio subtracted from the yaw-to-roll command ratio and adding 0.5 to the result thereof, and the portion of the roll command that is provided to the yaw fins is related to the roll command multiplied by a second value, the second value equal to a difference between unity and the first value.

* * * * *